(12) United States Patent
Hedrick et al.

(10) Patent No.: US 7,476,701 B2
(45) Date of Patent: Jan. 13, 2009

(54) CORROSION-RESISTANT PLY BOND ADHESIVES AND PRODUCTS AND PROCESSES INCORPORATING SUCH ADHESIVES

(75) Inventors: Bart Hedrick, Simpsonville, SC (US); Eduardo Nochebuena Romero, Pearland, TX (US)

(73) Assignee: Celanese International Corporation, Dallas, TX (US)

( * ) Notice: Subject to any disclaimer, the term of this patent is extended or adjusted under 35 U.S.C. 154(b) by 273 days.

(21) Appl. No.: 11/020,992

(22) Filed: Dec. 22, 2004

(65) Prior Publication Data

US 2006/0134445 A1    Jun. 22, 2006

(51) Int. Cl.
*C08K 5/00* (2006.01)
(52) U.S. Cl. .................. 524/236; 524/321; 524/405
(58) Field of Classification Search .......... 524/236, 524/327, 396, 321, 405
See application file for complete search history.

(56) References Cited

U.S. PATENT DOCUMENTS

| | | | |
|---|---|---|---|
| 3,135,648 A | 6/1964 | Hawkins | 161/249 |
| 5,466,318 A | 11/1995 | Bjork | 156/183 |
| 6,602,577 B1 | 8/2003 | Ostendorf et al. | 428/156 |
| 6,635,135 B2 | 10/2003 | Kuen et al. | 156/199 |
| 6,649,025 B2 | 11/2003 | Mills et al. | 162/123 |
| 2004/0109997 A1* | 6/2004 | Li et al. | 428/354 |
| 2004/0161402 A1* | 8/2004 | Brooks et al. | 424/70.15 |
| 2004/0261655 A1* | 12/2004 | Newbacher et al. | 106/31.01 |
| 2005/0045267 A1* | 3/2005 | Muvundamina | 156/78 |

* cited by examiner

*Primary Examiner*—Peter D Mulcahy
(74) *Attorney, Agent, or Firm*—M. Susan Spiering

(57) ABSTRACT

Corrosion-resistant adhesive compositions are provided. The compositions are useful for bonding together plies in multi-ply cellulosic fibrous structures. Multi-ply cellulosic fibrous structures incorporating the adhesives, products produced from such structures, and methods of producing the structures are also disclosed. The adhesive compositions incorporate a polyvinyl alcohol polymer and a corrosion inhibitor. The adhesive compositions may be sprayed or coated onto the cellulosic structures to bond layers of the structure to each other. The corrosion-resistant adhesive compositions are useful for preventing corrosion in the various devices used for handling and application of the adhesives such as spray equipment and applicator rolls. The cellulosic fibrous structures may be used to produce a variety of products including paper towels, toilet tissue, facial tissue, napkins, and other absorbent materials.

5 Claims, 1 Drawing Sheet

CORROSION-RESISTANT PLY BOND ADHESIVES AND PRODUCTS AND PROCESSES INCORPORATING SUCH ADHESIVES

BACKGROUND INFORMATION

Cellulosic fibrous web structures are used in a variety of common consumer products. For example, cellulosic fibrous structures are used as paper towels, toilet tissue, facial tissue, napkins and the like, commonly known as nonwoven. The large demand for these various paper products has created a demand for improved versions of the products and the methods of their manufacture.

Although single ply structures are used, multiple ply cellulosic fibrous structures are well known for use in the production of the consumer products. Such products are cellulosic fibrous structures having more than one ply laid over each other. These layers or plies are typically bonded to prevent delamination to maintain structural integrity when the final multilayer nonwoven is in use.

Bonding of the individual cellulosic fibrous webs into multi-ply structures is often achieved by embossing the structures on converting equipment without applying an adhesive. In a typical embossing process, two or more plies are fed through a nip formed between juxtaposed axially parallel embossing rolls. Embossment knobs on these rolls force each ply into engagement and contacting relationship with the opposing ply. The compressed regions of the plies have the benefits of producing an aesthetically pleasing pattern as well as providing a means for joining and maintaining the plies in face-to-face contact.

Controlling ply or web bonding is often difficult to achieve. Inadequate, excessive or inconsistent ply bonding can jam complex, high-speed machinery; generate high waste, and causing reduction in production rate and poor quality. The strength of bonding by embossing (without adhesive) may vary depending, among other things, on water content or dryness of fibrous webs, and on ambient air humidity. While bonding by embossing sometimes can be improved by increasing the pressure on the embossing rolls, such pressure can wear out the embossing rolls more quickly, particularly the female roll, which is usually a softer roll made of composite material onto which a pattern is impressed by the opposing, male, engraved metal roll. In addition, the journals and bearings of both embossing rolls can also wear out prematurely if subjected to increased pressure over a prolonged period.

In a different process, fibrous plies may be bonded using a chemical adhesive rather than by embossing. For example, U.S. Pat. No. 5,466,318 discloses a process for laminating webs using a water-based adhesive. Adhesive bonding is sometimes used to avoid some of the problems of bonding through embossing, but adhesives also cause problems, such as "through bonding" or "blocking", in which adjacent laminates bond to one another, and, prevent unwinding of the laminate product from its roll. Non-uniformity of bonding also causes problems, such as wrinkling of the tissue and bad printing.

U.S. Pat. Nos. 6,602,577, 6,635,134, and 6,649,025 disclose multi-ply paper structures in which an adhesive composition is used to bond the plies together. A variety of adhesive compositions are disclosed, including polyvinyl alcohol-based adhesives.

U.S. Pat. No. 3,135,648 disclosed that polyvinyl alcohol adhesives with high wet tack may be prepared by adding a water-soluble-boron compound to the copolymer and by adding an acid to lower pH.

BRIEF DESCRIPTION OF THE DISCLOSURE

This disclosure relates to corrosion-resistant adhesive compositions suitable for use in bonding together plies in multi-ply cellulosic fibrous structures. This disclosure also relates to multi-ply cellulosic fibrous structures incorporating the adhesives disclosed herein, products produced from such structures, and methods of producing the structures.

The adhesive compositions incorporate a polyvinyl alcohol polymer as well as at least one corrosion inhibitor. The corrosion inhibitor may be selected from neutralized amine compounds; aqueous blends of polyoxylates; a blend of at least one mercaptan and an amine compound; sodium benzoate; a combination of sulfurous acid, a dipotassium salt, and diethylaminoethanol; or mixtures thereof. The adhesive compositions are aqueous solutions incorporating dissolved solids that include from about 89 wt. % to about 95 wt. % of a polyvinyl alcohol polymer and from about 0.25 wt. % to about 1.0 wt. % of the corrosion inhibitor. The polyvinyl alcohol polymer may be a homopolymer or a copolymer incorporating at least one co-monomer such as ethylene, methyl acrylate, a vinyl amine, a carboxylic acid, branched alkyl acid vinyl esters such as vinyl esters of alpha-branched carboxylic acids having 5 and 9 to 11 carbon atoms are available from Resolution Performance Products under the designations VeoVa®, vinyl amines, other co-monomers.

In one embodiment, the polyvinyl alcohol polymers useful in accordance with the compositions, products and methods described herein have a degree of polymerization of about 300 to about 4,000, a number average molecular weight of about 13,300 to about 400,000, and is from about 88 mole % to about 99.9 mole % hydrolyzed.

In another embodiment, formulations produced with polyvinyl alcohol polymers having number average molecular weights about 124,000 to about 186,000 provide good adhesive performance without migration of the adhesive into the ply layers at a variety of solids concentrations including 4 parts solids. The formulations also exhibit no corrosive activity.

The adhesives compositions may be borated to provide a suitable consistency for application of the adhesives by a variety of processes and equipment and to improve wet adhesion. The adhesive compositions may be sprayed or coated onto the cellulosic structures to bond layers of the structure to each other. Corrosion inhibitors incorporating a neutralized amine; aqueous blends of polyoxylates; blends of at least one mercaptan and at least one amine compound, sodium benzoate, a combination of sulfurous acid, a dipotassium salt, diethylaminoethanol; or mixtures thereof are found to be especially and surprisingly compatible with the adhesive compositions described herein. In one embodiment, sodium benzoate is selected as the corrosion inhibitor.

The corrosion-resistant adhesive compositions are useful for preventing corrosion in the various devices used for handling and application of the adhesives such as spray equipment and applicator rolls.

The cellulosic fibrous structures may be used in a variety of products including paper towels, toilet tissue, facial tissue, napkins, and other absorbent products.

DETAILED DESCRIPTION

Figure 1:
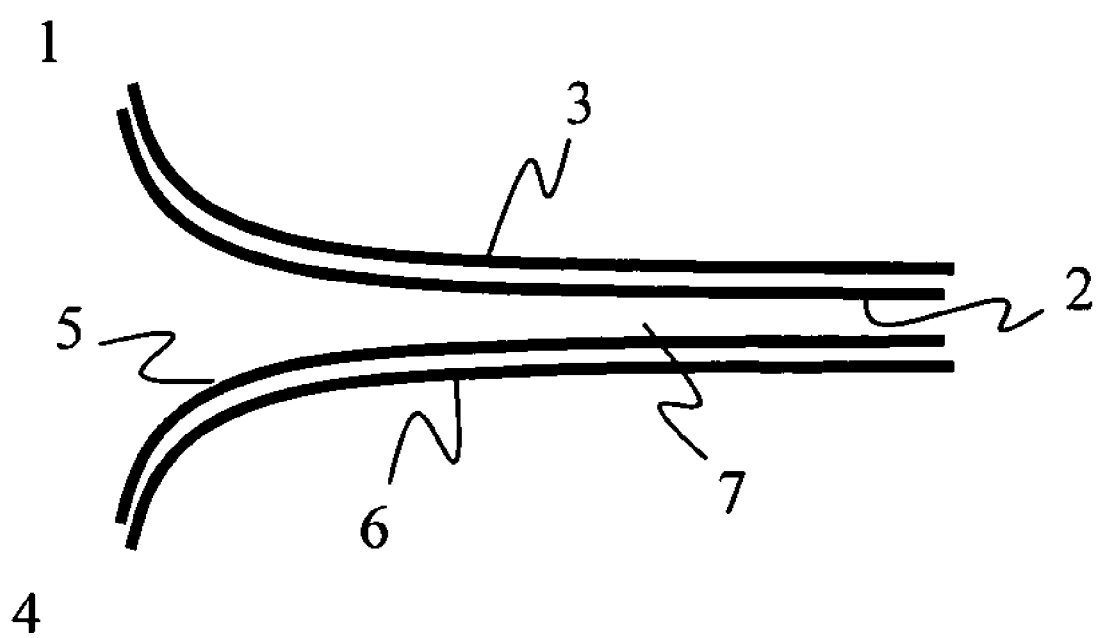
FIG. 1 is a schematic representation of application of the adhesive formulations described herein

A variety of consumer products are commonly produced from structures incorporating multiple layers of cellulosic fibrous webs such as tissue paper webs. These products include paper towels, toilet tissue, facial tissue, napkins, and other absorbent materials, such as materials for absorption of body fluids. This disclosure relates to corrosion-resistant adhesives for bonding multiple cellulosic fibrous webs together. The bonded webs are useful for production of a variety of consumer products, including those mentioned above. The adhesives disclosed herein are characterized by ease of application, usefulness as laminating binders and by their corrosion inhibition to process equipments. This disclosure also relates to multi-ply structures incorporating the adhesives disclosed herein, products produced from such structures, and methods of producing the structures.

The adhesives disclosed herein are applicable to all types of cellulosic fibrous webs and products such as paper towels, toilet tissue, facial tissue, napkins, and the like. However, the adhesives are found to be particularly useful in the production of multi-ply paper towel products.

The adhesives described herein incorporate a polyvinyl alcohol polymer as well as at least one corrosion inhibitor. The adhesive compositions are aqueous solutions incorporating dissolved solids that include from about 89 wt. % to about 95 wt. % of the polyvinyl alcohol polymer and from about 0.25 wt. % to about 1.0 wt. % of the corrosion inhibitor. The polyvinyl alcohol polymer may be a homopolymer or a copolymer incorporating at least one co-monomer such ethylene, methyl acrylate, a carboxylic acid, a branched alkyl acid vinyl ester such as vinyl esters of alpha-branched carboxylic acids having 5 and 9 to 11 carbon atoms available from Resolution Performance Products under the designations VeoVa®, an acryl amide, and other co-monomers. It is understood that the term "copolymer" as used herein is a polymer incorporating at least two monomer units and therefore includes terpolymers and the like.

In one embodiment, the polyvinyl alcohol polymers described herein have a degree of polymerization of about 300 to about 4,000, number average molecular weights of about 13,300 to about 400,000, and are from about 88 mole % to about 99.9 mole % hydrolyzed. In another embodiment, the polyvinyl alcohol hompolymers polymers described herein have a degree of polymerization of about 1600 to about 2600, number average molecular weights of about 70,000 to about 116,000, and are from about 95 mole % to about 99.9 mole % hydrolyzed.

Exemplary polyvinyl alcohol polymers useful for inclusion in the adhesives described herein are available from Celanese Chemicals under the designations SM 73, MH82, and SH95EXP. These polyvinyl alcohol polymers are tackified PVOH grades. SM73 has a viscosity 1200 to 1600 cps @ 10% solids and 20° C., and a pH of 4.0 to 4.7; MH82 has a viscosity of 4200 to 5900 cps @ 10% solids and 20° C., and a pH of 4.4 to 4.9; and SH95EXP has a viscosity of 65 to 105 cps @ 4.0 % solids and 20° C. and a pH of 4 to 5.5.

The polyvinyl alcohol polymers useful for inclusion in the adhesives described herein may be borated by reaction with a boron compound. Exemplary suitable boron compounds are boric acid, methyl borate, boron trifluoride, boric anhydride, pyroborates, peroxoborates and boranes. In one embodiment, the boron compound is sodium tetraborate decahydrate (borax). The boron compound may be added to the polyvinyl alcohol coating formulation or it may be applied as an aqueous solution overcoat to the already formed layer of polyvinyl alcohol.

Borating polyvinyl alcohol is useful to control the viscosity of the polyvinyl alcohol adhesive composition. This viscosity regulation is provided by the formation of a complex between boric ion and hydroxyl groups in the polyvinyl alcohol polymer. At pH's above 8, the borate ion exists and is available to cross-link and cause gelling of the adhesive composition. At lower pH's, the borate is tied up by hydrogen and is not available for cross-linking, thus gelation caused by borate ion is reversible. By borating the polyvinyl alcohol, a gelled adhesive composition may be produced that can be easily applied to and and/or adhered to the cellulosic web. Borating is also useful to provide high wet tack adhesives as disclosed in U.S. Pat. No. 3,135,648.

In one embodiment, the boric acid may be used as the borating agent and the boric acid may be incorporated into the adhesive formulation at a concentration of from about 3.0 wt. % to about 15.0 wt. % based upon the total weight of the polyvinyl alcohol polymer. In another embodiment, the boric acid may be incorporated into the adhesive formulations at a concentration of from about 4.0 wt. % to about 10.0 wt. % based upon the total weight of the polyvinyl alcohol polymer. In still another embodiment, the boric acid may be incorporated into the adhesive formulations at a concentration of from about 4.0 wt. % to about 7.0 wt. % based upon the total weight of the polyvinyl alcohol polymer.

In one embodiment, the corrosion inhibitor may be a neutralized amine compound. Neutralized amines useful in the adhesives formulations described herein are a variety of commercially available neutralized amine formulations. Exemplary neutralized amines useful for inclusion in the adhesive formulations are available from JACAM Chemicals, LLC in Sterling, Kans. under the designations WCI1156N, WCI 100, WCI 155, and WCI 1157.

In a second embodiment, the corrosion inhibitor may be an aqueous blend of polyoxylates. Aqueous blends of polyoxylates useful in the adhesives formulations described herein are a variety of commercially available aqueous polyoxylate formulations. A suitable aqueous blend of polyoxylates is commercially available from Nalco under the designation Nalco ACT 52211.

In another embodiment, the corrosion inhibitor may be a blend of at least one mercaptan and at least one amine compound. An exemplary corrosion inhibitor of this type is commercially available from Henkel under the designation Rodine 2002.

In still another embodiment, the corrosion inhibitor may be sodium benzoate. An exemplary corrosion inhibitor of this type is commercially available from Velsicol Chemical Corporation under the designation Probenz SG.

In yet another embodiment, the corrosion inhibitor may be a combination of sulfurous acid, a dipotassium salt, diethylaminoethanol. An exemplary corrosion inhibitor of this type is commercially available from GE Betz under the designation Optigard MCA 624.

In certain embodiments, the adhesive formulations may include a mixture of one or more of these various corrosion inhibitors.

In one embodiment, from about 89 wt. % to about 95 wt. % of the solids content of the adhesive formulation is derived from polyvinyl alcohol polymer and from about 0.25 wt. % to about 1.0 wt. % of the solids content of the adhesives formulation is derived from the corrosion inhibitor. In another embodiment, from about 90.0 wt. % to about 95.0 wt. % of the solids content of the adhesive formulation is derived from the polyvinyl alcohol polymer and from about 0.3 wt. % to about 0.6 wt. % of the solids content is derived from of the corrosion inhibitor. In still another embodiment, from about 93.0 wt. % to about 94.5 wt. % of the solids content of the adhesives formulation is derived from the polyvinyl alcohol polymer and from about 0.4 wt. % to about 0.55 wt. % of the solids content is derived from the corrosion inhibitor. Corrosion inhibitors falling within these concentrations ranges may be selected from any one of the corrosion inhibitors described above or from mixtures of one or more of the identified corrosion inhibitors. In specific embodiments, from about 0.25 wt. % to about 1.0 wt. % of the solids content of the adhesives formulation is derived from a neutralized amine corrosion inhibitor.

In one embodiment, the viscosity of the adhesive formulation incorporating the borated polyvinyl alcohol polymers ranges from about 70 cps to about 100 cps at 4% solids as measured at 20° C. using a Brookfield LVD at 60 rpm (#2 spindle).

The adhesive formulations described herein may also include a variety of other components. For example, in certain embodiments, the formulations may also incorporate from about 0.15 wt. % to about 0.5 wt. % of a defoamer, and from about 0.2 wt. % to about 1.7 wt. % of an organic acid to control pH of the final adhesive formulation. Exemplary useful organic acids are fumaric acid, citric acid, and mixtures thereof.

In one embodiment, the adhesive formulations described herein are dissolved in water to form an aqueous solution of the adhesive formulations. The components of the adhesive formulations described herein are solids at standard temperatures and pressures. With respect to the aqueous solutions, the amount of the solids dissolved therein may be described as the percent solids of the weight of the entire adhesive solution. In one embodiment, the aqueous adhesive formulations described herein have a solids content ranging from about 2.0 wt. % to about 8.0 wt. %. In a second embodiment, the solids content of the aqueous adhesive formulations ranges from about 2.5 wt. % to about 5.0 wt. %. In a third embodiment, the solids content is from about 3.0 wt. % to about 4.5 wt. %.

It has been unexpectedly determined that adhesive formulations incorporating polyvinyl alcohol polymers falling within the parameters outlined herein exhibit superior performance characteristics, when compared to polyvinyl alcohol polymers falling outside of the parameters discussed above. For example, polyvinyl alcohol polymers having lower hydrolysis levels are found to be unsuitable for the uses described herein. It has been determined that adhesives formulations incorporating polyvinyl alcohol polymers with levels of hydrolysis of 87% to 97% do not exhibit sufficient water resistance which results in inadequate wet strength in multi-ply tissue paper applications. For example, testing of a formulation incorporating an 88% hydrolyzed polyvinyl alcohol polymer revealed zero wet bond tensile strength when used in multi-ply tissue applications while a corresponding 99% hydrolyzed polyvinyl alcohol polymer formulation exhibited a wet bond tensile strength of at least about 3.03 kg per 2.54 linear cm.

The molecular weight of the polyvinyl alcohol polymers is also a factor in the performance of the adhesive formulations described herein. For example at aqueous adhesive formulation solids contents of 4 wt. %, it has been determined that polyvinyl alcohol polymers having a number average molecular weights of less than 70,000 do not perform well. The adhesives incorporating such homopolymers tend to migrate through the cellulosic fiber substrate.

The multi-ply structures described herein are produced from at least two cellulosic fibrous webs. In theory the number of webs is unlimited. However, in a first embodiment, the multi-ply structure incorporates two webs. In a second embodiment, the multi-ply structure has three plies and in a third embodiment, the structure incorporates four webs.

The adjacent webs of the structure are adhered to each other by at least one adhesive formulation described above. The adhesive formulations may be applied to a surface of each adjacent web or to the surface of one of the adjacent webs.

For each interface between adjoining layers of the structure, the adhesives may be applied at a concentration of less than about 20.0 g/m² in one embodiment. In another embodiment, the adhesives may be applied at a concentration from about 5.0 g/m² to about 15.0 g/m². In a third embodiment, the adhesives may be applied at a concentration from about 5.0 g/m² to about 10.0 g/m².

A schematic representation of a two-ply structure in accordance with this disclosure is depicted in FIG. 1. A first web 1 having two surfaces 2 and 3 is adhered to a second web 4 having two surfaces 5 and 6. A layer of at least one of the adhesive formulations described herein 7 is disposed between the surfaces 2 and 5 of the first and second webs respectively. The adhesive may be applied to each of surface 2 and surface 5 or may be applied to only one of surface 2 or surface 5. Generally, it is less complicated and more economic to apply the adhesive to only one of the two adjacent surfaces.

The adhesive formulation may be applied to the one or more surfaces by any suitable means known such as spraying as disclosed in U.S. Pat. No. 6,635,134 or applicator rolls as disclosed in U.S. Pat. No. 6,649,025. Once the adhesive applied, the first web 1 is joined to the second web 4 by any suitable means such as press rollers as disclosed in U.S. Pat. No. 6,649,025. When the webs are joined a laminate structure is formed.

After application of the adhesive formulations, the formulations dry by evaporation or absorption of the water therein, leaving the solid component of the formulations to adhere the layers of the laminate together.

It has been found that the adhesive formulations described herein provide good bond strength between the plies of laminate structures even at low adhesive usage rates. For example, the adhesive formulations provide levels of adhesion between cellulosic fibrous webs comparable to traditional polyvinyl alcohol-based adhesives at usage rates of 20% to 30% lower than the conventional polyvinyl alcohol formulations, based upon the total weight of the adhesive formulations used.

As mentioned above, inclusion of the neutralized amine as a corrosion inhibitor in the adhesive formulations described herein eliminates or reduces of corrosion of the metals parts in the various process equipment used to apply the adhesive formulations to produce the multi-ply structures.

Exemplary Data

The corrosiveness of adhesive formulations incorporating corrosion inhibitors, as described herein, and the corrosiveness of adhesives without corrosive inhibitors were compared in testing. The corrosiveness of various adhesive formulations was tested on mild steel coupons. The performance of exemplary adhesive formulations described herein was tested against control adhesive formulations without corrosion inhibitors. Specifically, three control formulations without corrosion inhibitors, one without an acid, one with citric acid, and the other with fumaric acid were tested. The formulation without an acid (A1) contained 100% of a commercial PVOH polymer available from Celanese Chemicals under the designation Celvol 165. This PVOH polymer has a degree of hydrolysis % of more than 99.3, a viscosity @ 4% solids and 20° C. of 62 to 72 centipoises. These formulations are identified in Table 1 as Formulations A1-A3 respectively. All control formulations were aqueous solutions at 4 wt. % solids.

A first set of six adhesive formulations, incorporating corrosion inhibitors, that are exemplary of the formulations described herein were tested. The first set of exemplary formulations incorporated either citric acid or fumaric acid. The exemplary formulations incorporated one of three corrosion inhibitors, a neutralized amine (WCI 1156 N), an aqueous blend of polyoxyalkylates (Nalco ACT 52211) and a blend of a mercaptan and an amine compound (Rodine 2002). The exemplary formulations are identified in Table I as B1-B6. All of the first set of exemplary formulations was aqueous solutions at 4 wt. % solids.

TABLE I

| | A1 | A2 | A3 | B1 | B2 | B3 | B4 | B5 | B6 |
|---|---|---|---|---|---|---|---|---|---|
| C165 wt. % | 100 | 94.75 | 94.75 | 94.28 | 94.28 | 94.28 | 94.28 | 94.28 | 94.28 |
| Boric acid wt. % | 0 | 5.0 | 5.0 | 4.98 | 4.98 | 4.98 | 4.98 | 4.98 | 4.98 |
| Citric wt. % | 0 | 0.25 | | 0.25 | 0.25 | 0.25 | 0 | 0 | 0 |
| Fumaric wt. % | 0 | 0 | 0.25 | | 0 | 0 | 0.25 | 0.25 | 0.25 |
| Nalco ACT 52511 wt. % | 0 | 0 | 0 | 0.49 | 0 | 0 | 0.49 | 0 | 0 |
| Rodine 2002 wt. % | 0 | 0 | 0 | 0 | 0.49 | 0 | 0 | 0.49 | 0 |
| WCI 1156 N wt. % | 0 | 0 | 0 | 0 | 0 | 0.49 | 0 | 0 | 0.49 |

The testing used mild steel blanks or coupons measuring 7.62 cm by 1.27 cm having a thickness of 1/16 inch (0.1588 cm) and weighing 10-11.5 grams that were placed in 200 grams solutions of adhesives at 4% solids. The solutions and coupons were placed in an oven regulated at a constant temperature of 54.4° C. The adhesive solutions were evaluated after 24, 48, 72, 96, 120, and 168 hours intervals for color change. After 168 hours in the solutions, the metal coupons were removed, cleaned, dried, and reweighed to determine the weight of metal lost form each coupon. The PVOH control solution without an acid exhibited a clear color and 0% metal loss after 168 hours of exposure. The adhesive solutions incorporating an acid and in which no corrosion inhibitor was present exhibited a dark brown color and 0.74 wt. % to 0.75 wt. % metal coupon weight loss after 168 hours. Weight loss in solutions containing acid and a corrosion inhibitor was minimized. Details of these results are set forth in Table II.

TABLE II

| Formulation | 24 hrs @ 54.4° C. | 48 hrs @ 54.4° C. | 72 hrs @ 54.4° C. | 96 hrs @ 54.4° C. | 168 hrs @ 54.4° C. | % wt. loss |
|---|---|---|---|---|---|---|
| A1 | 1– clear | 1– clear | 1 clear | 1 clear | 1 clear | 0 |
| A2 | 4– light bn | 5– bn | 5– bn | 5– bn | 5– bn | 0.75 |
| B1 | 2– light gn | 4– light bn | 5– bn | 5– bn | 5+ bn | 0.51 |
| B2 | 1– clear | 2– light gn | 3 light gn | 3 gn | 4 light bn | 0.22 |
| B3 | 2– light gn | 3– gn | 3– light gn | 4– light bn | 5 bn | 0.47 |
| A3 | 4– light bn | 5– bn | 5– bn | 5– bn | 5– bn | 0.74 |
| B4 | 5– bn | 5+ – bn | 5+ bn | 5– bn | 5+ bn | 0.35 |
| B5 | 4– light bn | 4 light bn | 4 light bn | 5 bn | 5 bn | 0.24 |
| B6 | 1– clear | 1– clear | 1 clear | 1 clear | 1 clear | 0 |
| A2 | N/A | 4– bn | 5– bn | 5– drk bn | 5– drk bn | 0.75 |
| B2 | N/A | 2– light gn | 3 light gn | 3 light gn | 3 light gn | 0.26 |
| B3 | N/A | 3– light bn | 3– light gn | 4– light bn | 4– light bn | 0.52 |
| A3 | N/A | 4– bn | 5– bn | 5– drk bn | 5– drk bn | 0.74 |
| B5 | N/A | 3.5 light bn | 4 light bn | 4 light bn | 4 light bn | 0.28 |
| B6 | N/A | 1– clear | 1 clear | 1 clear | 1 clear | 0 |

As seen from the data, the neutralized amine corrosion inhibitor and fumaric acid combination demonstrated unexpectedly superior results as compared to other corrosion inhibitor combinations. In particular, see the reported results with respect to the "B6" formulation.

A second set of five exemplary adhesive formulations in accordance with the formulations described herein was tested. All of the formulations incorporate a neutralized amine corrosion inhibitor and a defoamer. The defoamer used was an alkaline oxide copolymer. Such a defoamer is commercially available from Harcos Chemicals under the designation HL-36. The exemplary formulations are set forth in Table III as formulations C1-C5. All formulations were prepared by dissolving in water, at 4.0 wt. % solids, based upon the total weight of the formulation.

TABLE III

| | C1 | C2 | C3 | C4 | C5 |
|---|---|---|---|---|---|
| C165 wt. % | 94.00 | 90.55 | 94.00 | 94.00 | 93.5 |
| Boric acid wt. % | 5.0 | 8.0 | 5.0 | 5.0 | 4.75 |
| Fumaric wt. % | 0.25 | 0.7 | 0.5 | 0.25 | 1.00 |
| WCI 1156 N wt. % | 0.5 | 0.5 | 0.25 | 0.5 | 0.5 |
| Defoamer wt. % | 0.25 | 0.25 | 0.25 | 0.25 | 0.25 |

Exemplary formulations C1-C5 were also tested against mild steel blanks or coupons measuring 7.62 cm by 1.27 cm having a thickness of 1/16 inch (0.1588 cm) and weighing 10-11.5 grams that were placed in 200 grams solutions of adhesives at 4% solids. The solutions and coupons were placed in an oven regulated at a constant temperature of 54.4° C. The adhesive solutions were evaluated after 24, 48, 72, 96, and 144 hours intervals for color change. After 144 hours in the solutions, the metal coupons were removed, cleaned, dried, and reweighed to determine the weight of metal lost form each coupon. All formulations exhibited a clear color and minimal metal loss after 144 hours of exposure. Details of these results are set forth in Table IV.

TABLE IV

| Sample | color 24 hrs 1 to 5 clear to dark | color 48 hrs 1 to 5 | color 72 hrs 1 to 5 | color 96 hrs 1 to 5 | color 144 hrs 1 to 5 | % wt Loss 144 hrs |
|---|---|---|---|---|---|---|
| C1 | 1 clear | 1– clear | 1– clear | 1– clear | 1– clear | 0.007 |
| C2 | 1 clear | 1– clear | 1– clear | 1– clear | 1– clear | 0 |

TABLE IV-continued

| Sample | color 24 hrs 1 to 5 clear to dark | color 48 hrs 1 to 5 | color 72 hrs 1 to 5 | color 96 hrs 1 to 5 | color 144 hrs 1 to 5 | % wt Loss 144 hrs |
|---|---|---|---|---|---|---|
| C3 | 1 clear | 1 clear | 1– clear | 1– clear | 1– clear | 0.003 |
| C4 | 1 clear | 1 clear | 1– clear | 1– clear | 1– clear | 0.09 |
| C5 | 1 clear | 1 clear | 1– clear | 1– clear | 1– clear | 0.01 |

As seen from the data in Table IV, formulations incorporating a neutralized amine corrosion inhibitor and a defoamer performed well as evidenced by light colors and minimal weight loss.

Other classes of corrosion inhibitors were evaluated in additional testing. In this testing, the corrosiveness of certain PVOH adhesive formulations incorporating sodium benzoate and a combination of sulfurous acid, a dipotassium salt, diethylaminoethanol as corrosion inhibitors were evaluated. The corrosiveness of these adhesive formulations was compared to adhesive formulations incorporating a neutralized amine corrosion inhibitor.

The corrosiveness of the various adhesive formulations was tested on mild steel coupons. Specifically, two neutralized amine formulations at pH's of 4.2 and 5.2, were compared with formulations incorporating sodium benzoate and a combination of sulfurous acid, a dipotassium salt, and diethylaminoethanol corrosion inhibitors having pHs of 4.2 and 5.2. All of the formulations incorporate the commercial PVOH polymer available from Celanese Chemicals under the designation C165, as described in detail above. The sodium benzoate used was a commercial product available from Velsicol Chemical Corporation under the designation Probenz SG. The combination of sulfurous acid, dipotassium salt, and diethylaminoethanol used was a commercial product available from GE Betz under the designation Optiguard MCA624. The pHs of the solutions were controlled by the addition of fumaric acid as indicated. All formulations incorporated a defoamer, HL-36, as described above. These formulations are identified in Table V as Formulations C4-C5 (neutralized amine formulations corresponding to formulations C4 and C5 discussed above), D1-D2 (sodium benzoate) and E1-E2 (combination of sulfurous acid, dipotassium salt, and diethylaminoethanol), respectively with the applicable pH indicated. All formulations were aqueous solutions at 4.0 wt. % solids with the wt. % of the solids attributable to the individual components as indicated.

TABLE V

|  | C4 | C5 | D1 | D2 | E1 | E2 |
|---|---|---|---|---|---|---|
| pH | 5.20 | 4.20 | 4.20 | 5.20 | 4.20 | 5.20 |
| C165 wt. % | 94.00 | 93.50 | 93.00 | 94.00 | 93.00 | 94.00 |
| Boric Acid wt. % | 5.00 | 4.75 | 4.75 | 4.95 | 4.94 | 4.95 |
| Fumaric wt. % | 0.25 | 1.00 | 1.50 | 0.30 | 1.31 | 0.30 |
| WCI 1156 N | 0.50 | 0.50 | 0 | 0 | 0 | 0 |
| Probenz SG | 0 | 0 | 0.50 | 0.50 | 0 | 0 |
| Optigard | 0 | 0 | 0 | 0 | 0.50 | 0.50 |
| HL-36 | 0.25 | 0.25 | 0.25 | 0.25 | 0.25 | 0.25 |

The testing used mild steel blanks or coupons measuring 7.62 cm by 1.27 cm having a thickness of 1/16 inch (0.1588 cm) and weighing 10-11.5 grams that were placed in 200 grams solutions of adhesives at 4% solids or suspended in an enclosed chamber containing a vapor of the solutions. The coupons were exposed to the solutions for 168 hours under controlled temperatures. The degree of corrosion was determined by weight loss of the coupon during exposure. Details of these results are set forth in Tables VI-VIII.

TABLE VI

| Formulation | C5 | C5 | C5 | C5 | C4 | C4 | C4 | C4 |
|---|---|---|---|---|---|---|---|---|
| pH | 4.20 | 4.20 | 4.20 | 4.20 | 5.20 | 5.20 | 5.20 | 5.20 |
| Temp. (° C.) | 135.00 | 135.00 | Room | 135.00 | 135.00 | 135.00 | room | 135.00 |
| Phase | Lq. | Lq. | Lq. | Vp. | Lq. | Lq. | Lq. | Vp. |
| Volume in 3 (*) | 0.0876 | 0.0813 | 0.0864 | 0.0409 | 0.0825 | 0.0580 | 0.0887 | 0.0404 |
| Wt. Loss (g) | 0.02 | 0.02 | 0.02 | 0.69 | 0.00 | 0.00 | 0.00 | 0.51 |
| % Wt. Loss | 0.16 | 0.20 | 0.21 | 13.04 | 0.00 | 0.00 | 0.00 | 9.78 |
| MPY (mils/yr.) | 2.10 | 2.50 | 2.80 | 161.00 | 0.00 | 0.00 | 0.00 | 118.00 |

TABLE VII

| Formulation | D1 | D1 | D1 | D1 | D2 | D2 | D2 | D2 |
|---|---|---|---|---|---|---|---|---|
| pH | 4.2 | 4.2 | 4.2 | 4.2 | 5.2 | 5.2 | 5.2 | 5.2 |
| Temp. (° C.) | 135 | room | 135 | room | 135 | room | 135 | room |
| Phase | liq | Lq. | Vp. | Vp. | Lq. | Lq. | Vp. | Vp. |
| Volume in 3 (*) | 0.0863 | 0.0887 | 0.0832 | 0.058 | 0.0865 | 0.0841 | 0.0829 | 0.0873 |
| Wt. Loss | 0.0798 | 0.0138 | 0.6221 | 0.0521 | 0.0491 | 0.0176 | 0.1756 | 0.0043 |
| % Wt. Loss | 0.72 | 0.12 | 5.81 | 0.49 | 0.44 | 0.16 | 1.64 | 0.04 |
| MPY | 9.50 | 1.60 | 74.30 | 6.20 | 5.90 | 1.00 | 21.30 | 0.50 |

TABLE VIII

| Formulation | E1 | E1 | E1 | E1 | E2 | E2 | E2 | E2 |
|---|---|---|---|---|---|---|---|---|
| pH | 4.2 | 4.2 | 4.2 | 4.2 | 5.2 | 5.2 | 5.2 | 5.2 |
| Temp. (° C.) | 135 | room | 135 | room | 135 | room | 135 | room |
| Phase | liq | Lq. | Vp. | Vp. | Lq. | Lq. | Vp. | Vp. |

TABLE VIII-continued

| Formulation | E1 | E1 | E1 | E1 | E2 | E2 | E2 | E2 |
|---|---|---|---|---|---|---|---|---|
| Volume in 3 (*) | 0.0833 | 0.0854 | 0.0807 | 0.056 | 0.0838 | 0.0884 | 0.0869 | 0.0503 |
| Wt. Loss | 0.1113 | 0.096 | 0.4279 | 0.0404 | 0.0449 | 0.022 | 0.2751 | 0.0099 |
| % Wt. Loss | 1.04 | 0.87 | 4.12 | 0.36 | 0.46 | 0.19 | 2.46 | 0.15 |
| MPY | 13.40 | 11.50 | 52.00 | 4.80 | 1.70 | 2.60 | 32.90 | 1.90 |

Tables VI to VIII report the results of the corrosion tests with the three different corrosion inhibitors at the two different adhesive solution pH's, two different temperatures for the steel coupons exposed to the solutions in liquid and vapor phases. Results are extrapolated to one year corrosion time and are expressed in terms of mils per year lost ("MPY").

With respect to the various ranges set forth herein, any upper limit recited may, of course, be combined with any lower limit for selected sub-ranges.

All patents and publications referred to herein are hereby incorporated by reference in their entireties.

Although the present invention and its advantages have been described in detail, it should be understood that various changes, substitutions, and alterations could be made without departing from the spirit and scope of the invention as defined by the following claims.

What is claimed is:

1. An adhesive composition comprising an aqueous solution of (i) a polyvinyl alcohol polymer with a degree of polymerization of about 1,600 to about 2,600, a number average molecular weight of about 70,000 to about 116,000, and being about 95 mole % to about 99.9 mole % hydrolyzed;

(ii) a neutralized amine corrosion inhibitor present in an amount such that about 0.25 wt % to about 1 wt % of the solids content of the adhesive formulation is derived from the neutralized amine corrosion inhibitor;

(iii) about 0.2 wt % to about 1.7 wt % of fumaric acid; and (iv) about 4.0 wt % to about 7.0 wt % boric acid, based on the total weight of the polyvinyl alcohol polymer.

2. The adhesive composition of claim 1 wherein the polyvinyl alcohol polymer is selected from the group consisting of a homopolymer, a copolymer incorporating at least one comonomer selected from ethylene, methyl acrylate, a carboxylic acid, an alkyl acid vinyl ester, an acryl amide, and a vinyl amine.

3. The adhesive composition of claim 1 further comprising about 0.15 wt % to about 0.5 wt % of a defoamer.

4. The adhesive composition of claim 1 having a pH of about 5.4.

5. The adhesive composition of claim 1, wherein the viscosity of the adhesive composition is about 70 cps to about 100 cps at 4% solids measured at 20° C.

* * * * *